(12) United States Patent
Khalid

(10) Patent No.: US 10,467,809 B2
(45) Date of Patent: Nov. 5, 2019

(54) METHODS AND SYSTEMS FOR PRESENTING A VIDEO STREAM WITHIN A PERSISTENT VIRTUAL REALITY WORLD

(71) Applicant: Verizon Patent and Licensing Inc., Arlington, VA (US)

(72) Inventor: Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/861,468

(22) Filed: Jan. 3, 2018

(65) Prior Publication Data

US 2019/0206129 A1    Jul. 4, 2019

(51) Int. Cl.
| | | |
|---|---|---|
| *G06T 19/00* | (2011.01) | |
| *G06F 3/01* | (2006.01) | |
| *G06Q 30/02* | (2012.01) | |
| *G06T 19/20* | (2011.01) | |
| *A63F 13/25* | (2014.01) | |
| *H04N 21/414* | (2011.01) | |

(52) U.S. Cl.
CPC ............ *G06T 19/003* (2013.01); *A63F 13/25* (2014.09); *G06F 3/011* (2013.01); *G06Q 30/0241* (2013.01); *G06T 19/20* (2013.01); *H04N 21/41415* (2013.01)

(58) Field of Classification Search
None
See application file for complete search history.

(56) References Cited

U.S. PATENT DOCUMENTS

| | | | | |
|---|---|---|---|---|
| 6,825,860 B1* | 11/2004 | Hu | ................... | G06F 3/0481 345/660 |
| 2003/0005439 A1* | 1/2003 | Rovira | ................ | H04N 7/163 725/37 |
| 2006/0253796 A1* | 11/2006 | Wang | ................. | G06F 9/451 715/788 |
| 2011/0263332 A1* | 10/2011 | Mizrachi | ............ | A63F 13/12 463/42 |
| 2013/0124311 A1* | 5/2013 | Sivanandan | ........ | G06Q 30/02 705/14.51 |
| 2018/0115807 A1* | 4/2018 | Todorovic | ......... | H04N 7/148 |

OTHER PUBLICATIONS

Fox Sport Virtual Reality, https://www.foxsports.com/virtual-reality as accessed on Jan. 3, 2018.

* cited by examiner

*Primary Examiner* — Frank S Chen

(57) ABSTRACT

An exemplary virtual reality presentation system streams virtual reality data representative of a persistent three-dimensional ("3D") virtual reality world configured to be experienced by a user using a media player device while the virtual reality data is streaming. The persistent 3D virtual reality world is configured for one-to-many streaming and to dynamically persist independently of whether the user is experiencing the persistent 3D virtual reality world. The virtual reality presentation system further accesses video data representative of two-dimensional ("2D") video content and integrates the video data with the virtual reality data while the virtual reality data is streaming. The video data and the virtual reality data are integrated such that the 2D video content is viewable by the user within the persistent 3D virtual reality world as the user experiences the persistent 3D virtual reality world. Corresponding methods are also disclosed.

20 Claims, 12 Drawing Sheets

METHODS AND SYSTEMS FOR PRESENTING A VIDEO STREAM WITHIN A PERSISTENT VIRTUAL REALITY WORLD

BACKGROUND INFORMATION

Virtual reality worlds based on real-world and/or imaginary places and objects may be presented to users of media player devices configured to present virtual reality media content. For example, a media player device may present virtual reality media content to a user by way of a field of view that acts as a window into a particular virtual reality world. By moving the field of view, the user may be able to look at objects within the virtual reality world that are located in any of various directions (e.g., forward, backward, left, right, up, down, etc.) with respect to a virtual vantage point of the user within the virtual reality world. While virtual reality technology may provide various engaging, entertaining, and meaningful experiences to users, there remains room for further improvement and diversification of virtual reality experiences.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
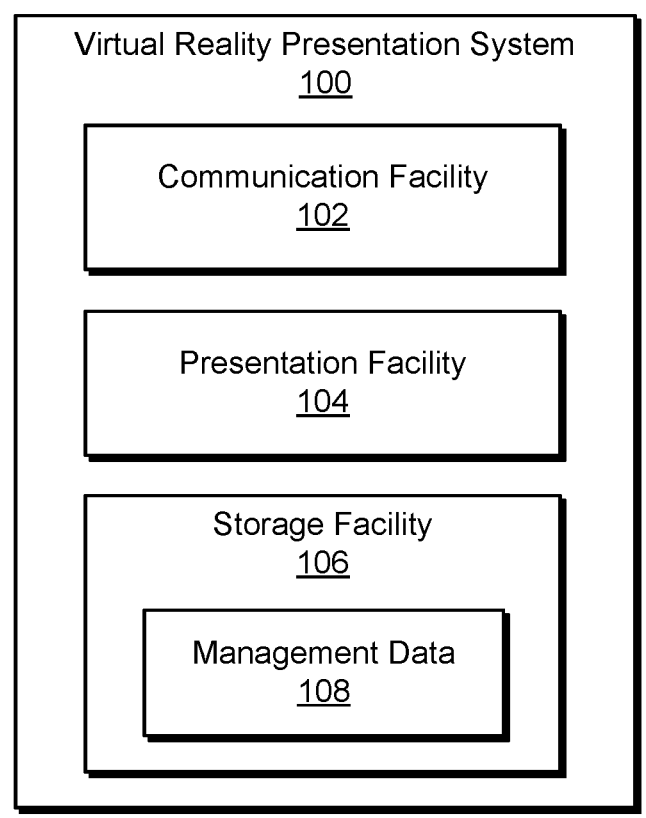
FIG. 1 illustrates an exemplary virtual reality presentation system for presenting a video stream within a persistent three-dimensional ("3D") virtual reality world according to principles described herein.

Systems and methods for presenting a video stream within a persistent virtual reality world are described herein. For example, as will be described in more detail below, certain implementations of a virtual reality presentation system may stream (e.g., transmit or receive) virtual reality data representative of a persistent three-dimensional ("3D") virtual reality world configured to be experienced by a user using a media player device while the virtual reality data is streaming. For example, the virtual reality presentation system may stream the virtual reality data by either transmitting the data or receiving the data while the virtual reality data is concurrently being rendered or otherwise used to allow the user to experience the persistent 3D virtual reality world. As used herein, the virtual reality data representative of the persistent 3D virtual reality world may include virtual reality data representative of the entire persistent 3D virtual reality world or virtual reality data representative of only a portion of the persistent 3D virtual reality world, such as virtual reality data representative of a select portion of the virtual reality world as viewed from a particular vantage point.

As will be described in more detail below, the 3D virtual reality world presented to the user may be "persistent" in the sense that the world may dynamically persist (e.g., continue to exist, change, be experienced by others, and/or be updated) independently of whether the user is experiencing the persistent 3D virtual reality world. For example, rather than being reset each time that the user experiences the persistent 3D virtual reality world, or being "paused" or suspended within computer memory or storage while the user is not experiencing it, the persistent 3D virtual reality world may continue to exist and change even when the user is not experiencing the persistent 3D virtual reality world. Additionally, the persistent 3D virtual reality world may be configured for one-to-many streaming such as by implementing a stateful, one-to-many streaming paradigm as will be described in more detail below.

The virtual reality presentation system may access video data representative of two-dimensional ("2D") video content. For example, the 2D video content may include a linearly-scheduled media content channel (e.g., a live network or cable television channel), a non-linear media content program (e.g., a web video, an on-demand video, a recorded video, a video decoded from a physical medium such as a digital disc, etc.), or the like. While the virtual reality data is streaming, the virtual reality presentation system may integrate the video data with the virtual reality data. More particularly, the virtual reality presentation system may integrate the video data with the virtual reality data such that the 2D video content is viewable by the user, as 2D content, within the persistent 3D virtual reality world as the user experiences the persistent 3D virtual reality world.

As will be described in more detail below, a virtual reality presentation system may be implemented by a virtual reality provider system on a server side of a server-client data delivery architecture, by a client-side system specifically associated with a particular user, and/or by a combination of system components on both the server side and the client side of a server-client data delivery architecture.

In certain exemplary implementations, a virtual reality system (e.g., such as a virtual reality provider system) may provide a persistent 3D virtual reality world configured to be experienced (e.g., concurrently or non-concurrently) by a plurality of users. For example, the virtual reality system may generate virtual reality data representative of a persistent 3D virtual reality world configured to be jointly experienced by a first user and a second user who are located in arbitrary locations with respect to one another. For instance, the first and second users may physically be located in the same room in some examples, while, in other examples, the first and second users may be physically located remotely from one another (e.g., in different rooms, in different cities, in different parts of the world, etc.). Regardless of their respective locations, the first and second users may use respective first and second media player devices to experience the persistent 3D virtual reality world. Additionally, similar to the persistent 3D virtual reality world described above, the generated persistent 3D virtual reality world may be configured for one-to-many streaming and/or configured to dynamically persist independently of whether either the first or second user is experiencing the persistent 3D virtual reality world at any particular time.

The virtual reality system may stream the virtual reality data by transmitting a first data stream including the virtual reality data to the first media player device and transmitting a second data stream including the virtual reality data (e.g., the same portions and/or different portions of the virtual reality data as included within the first data stream) to the second media player device. The virtual reality system may also access 2D video content such as a linearly-scheduled media content channel (e.g., a network or cable television channel) upon which a linearly-scheduled media content program is being presented. While the virtual reality data is streaming, the virtual reality system may integrate the 2D video content channel with the virtual reality data (e.g., within both the first and second data streams) such that the 2D video content program is viewable by the first and second users within the persistent 3D virtual reality world as the first and second users experience the persistent 3D virtual reality world.

Various benefits may arise from methods and systems for presenting a video stream within a persistent virtual reality world described herein. For example, disclosed methods and systems may benefit users by allowing them to shift the activity of watching television (an activity conventionally pursued in the real world) from the real world into a virtual reality world where the experience may be augmented and optimized in various ways. For instance, while, in the real world, a user may typically watch television on a relatively small screen by himself or herself, disclosed methods and systems herein may allow the user to utilize virtual reality technology to watch television in a completely different environment (e.g., on a beach, in a classy lounge, in a corner bar, etc.) on a large screen with friends or others who, while physically located remotely from the user, appear to be seated on a virtual sofa or bar stool next to the user.

As will be described in more detail below, the television watching experience may be further augmented in various other ways such as by allowing the user to interact with others also experiencing the persistent 3D virtual reality world, by allowing the user to experience interactive or optimized media content associated with certain programming, and so forth. As used herein, "watching television" may refer to viewer consumption of any of various types of 2D video content. For example, viewing a scheduled television program, a movie, a web video, an on-demand program, or any of various other types of 2D video content may each be examples of watching television as the term is used herein.

Even in situations where users enter a virtual reality world for reasons other than specifically to seek an enhanced television watching experience, having the ability to watch the same video content within the virtual reality world as the user would watch in the real world (i.e., in accordance with methods and systems disclosed herein) may be convenient because the user may watch a scheduled program without having to leave the persistent 3D virtual reality world.

Additionally, having 2D video content integrated into a persistent 3D virtual reality world may make the world increasingly realistic and immersive (e.g., as compared to a virtual reality world that has canned video content rather than live scheduled programming, for example), and/or otherwise desirable. In some examples, a user may watch more than one 2D video program at once on different screens within the persistent 3D virtual reality world, or may enjoy other such experiences that may not be convenient or possible to do in the real world.

Additional benefits may arise from virtual reality worlds (e.g., virtual reality worlds in which video streams are presented) that are configured for one-to-many streaming and/or configured to be persistent in the sense that they dynamically persist (e.g., exist, continue to change, etc.) independent of any particular user experiencing them. For example, a plurality of users may access and experience the same persistent 3D virtual reality world simultaneously or concurrently as the world is streaming (e.g., being broadcast) by way of a one-to-many streaming paradigm. In some examples, different users may even see and/or otherwise interact with one another within the world. Additionally, because a user may understand that a persistent 3D virtual reality world exists independently of his or her involvement in the world, he or she may be more likely to frequently power up his or her media player device to visit the virtual reality world and see what is new, see who else is currently spending time there, maintain a reputation as a well-known or "regular" visitor to the world, or the like. As such, a virtual reality media provider generating and maintaining this type of persistent 3D virtual reality world may attract and retain users within a virtual reality space, such as a sponsored space that facilitates various types of monetization opportunities such as a powerful advertising platform with unique advertising opportunities for potential sponsors, an e-commerce platform for marketing and selling real-world goods and services by way of virtual commerce transactions taking place within the virtual reality world, powerful analytics accumulation to track what users pay attention to while watching media content (including advertisements), and so forth.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary virtual reality presentation system 100 ("system 100") for presenting a video stream within a persistent virtual reality world. In particular, system 100 may present (e.g., render, prepare and transmit for rendering, etc.) video data and virtual reality data that are integrated such that 2D video content is viewable by a user within a persistent 3D virtual reality world as the user experiences the persistent 3D virtual reality world. As shown, system 100 may include, without limitation, a communication facility 102, a presentation facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between different systems or devices (e.g., server-side and/or client-side systems or devices) disposed at different locations as may serve a particular implementation. Additionally, one or more of facilities 102 through 106 may be omitted from system 100 in certain implementations, while additional facilities may be included within system 100 in the same or other implementations. Each of facilities 102 through 106 will now be described in more detail.

Communication facility 102 may include any hardware and/or software (e.g., including network interfaces, computing devices, software running on or implementing such interfaces or devices, etc.) that may be configured to receive and/or transmit data such as virtual reality data, video data, or the like for presentation by presentation facility 104. For example, communication facility 102 may stream virtual reality data representative of a persistent 3D virtual reality world, which may be configured to be experienced by a user using a media player device while the virtual reality data is streaming. The persistent 3D virtual reality world may be configured for one-to-many streaming and configured to dynamically persist independently of whether the user is experiencing the persistent 3D virtual reality world. Along with streaming the virtual reality data, communication facility 102 may further access video data representative of 2D video content.

Presentation facility 104 may also include one or more physical computing devices (e.g., the same hardware and/or software components included within communication facility 102 and/or components separate from those of communication facility 102) that perform various operations to process, prepare, and present data communicated by communication facility 102. For example, presentation facility 104 may integrate the video data accessed by communication facility 102 with the virtual reality data streamed by communication facility 102 while the virtual reality data is streaming. In this way, presentation facility may present the persistent 3D virtual reality world to the user such that the 2D video content is viewable by the user within the persistent 3D virtual reality world as the user experiences the persistent 3D virtual reality world.

As will be described in more detail below, system 100 may be implemented in various configurations by server-side and/or client-side devices. As such, it will be understood that the "presentation" of the persistent 3D virtual reality world performed by presentation facility 104 may be performed directly by rendering integrated virtual reality data and video data to a screen viewed by a user, or indirectly by preparing data for transmission (e.g., by communication facility 102) to another system configured to perform the actual rendering of the integrated virtual reality data and video data to the screen viewed by the user. Regardless of whether presentation facility 104 presents a persistent 3D virtual reality world to the user directly or indirectly, the presentation may result in 2D video content being viewable by the user within the persistent 3D virtual reality world as the user experiences the persistent 3D virtual reality world.

Storage facility 106 may include management data 108 and/or any other data received, generated, managed, maintained, used, and/or transmitted by facilities 102 and 104. Management data 108 may include buffered video data and/or virtual reality data being communicated by communication facility 102, data used in the integration and/or presentation operations performed by presentation facility 104, and/or any other data used to implement methods and systems described herein as may serve a particular implementation.

Figure 2:
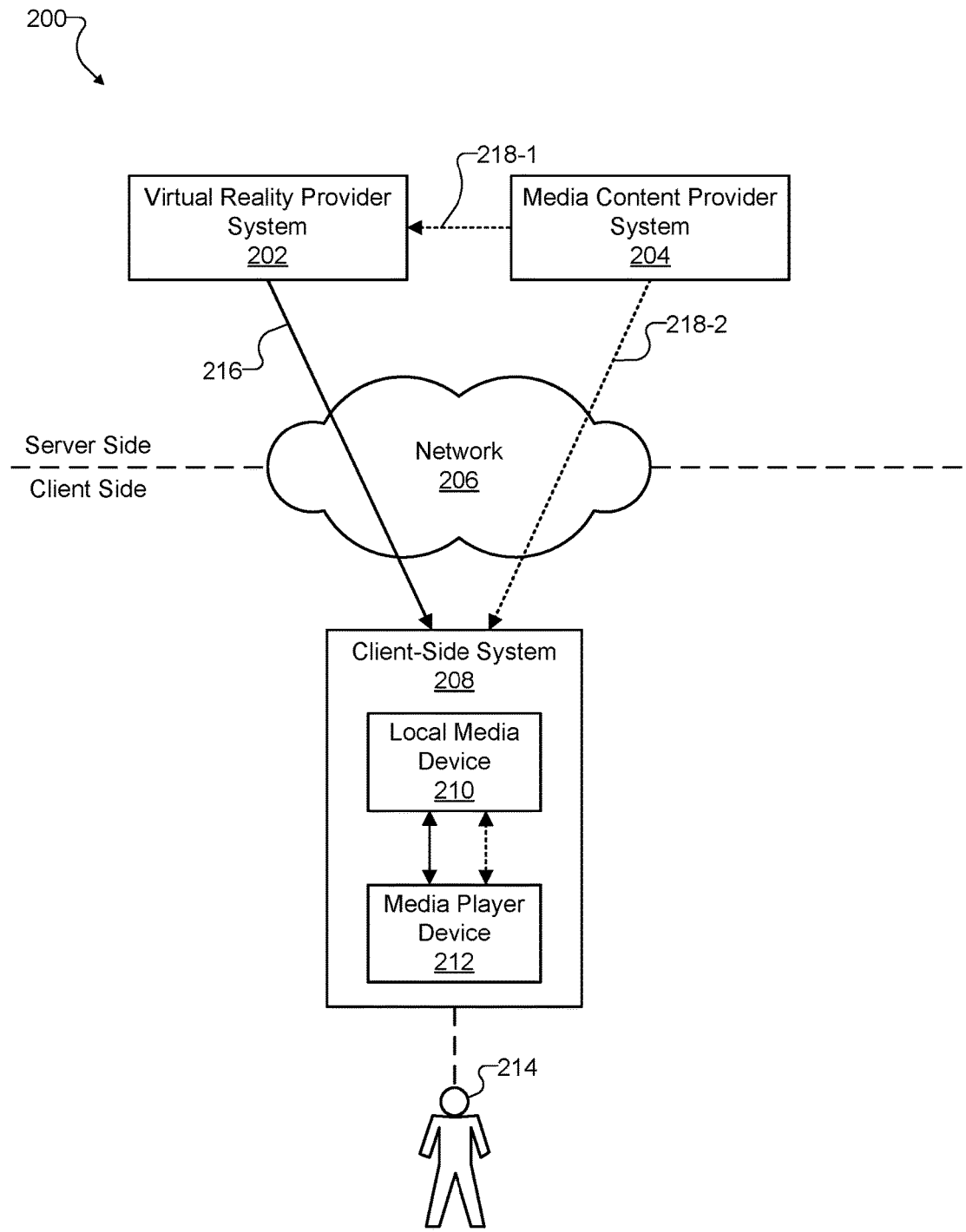
FIG. 2 illustrates an exemplary configuration in which the virtual reality presentation system of FIG. 1 may be implemented to present a video stream within a persistent 3D virtual reality world according to principles described herein.

To illustrate system 100 in operation, FIG. 2 shows an exemplary configuration 200 in which system 100 may be implemented to present a video stream within a persistent 3D virtual reality world. As shown in FIG. 2, server-side systems such as a virtual reality provider system 202 and a media content provider system 204 are communicatively coupled to one another and to a network 206 on a server side of a server-client data delivery architecture, while a client-side system 208 including a local media device 210 and a media player device 212 is communicatively coupled to network 206 on a client side of the server-client data delivery architecture. A user 214 is also shown to be associated with client-side system 208 and may operate and use local media device 210, media player device 212, and/or other client-side devices or aspects of client-side system 208 as may serve a particular implementation. Each of the components depicted in configuration 200 will now be described in more detail.

Virtual reality provider system 202 may include one or more computing devices (e.g., server computers, database storage centers, etc.) for capturing, accessing, generating, distributing, and/or otherwise providing and curating virtual reality media content to be delivered to users such as user 214. As such, virtual reality provider system 202 may generate and/or access (e.g., from a virtual reality content creation system) virtual reality data representative of image data and audio data. Virtual reality provider system 202 may also process, prepare, and deliver this data in a form that may be used by media player devices such as media player device 212 to provide virtual reality experiences for users such as user 214.

Media content provider system 204 may provide video data representative of 2D video content for use by virtual reality provider system 202 and/or client-side system 208. As such, while media content provider system 204 is illustrated as a single system, it will be understood that media content provider system 204 may represent a variety of different systems operated by or associated with a variety of separate parties such as television providers (e.g., network or cable television providers), Internet service providers, subscription or on-demand video service providers, and/or any other providers of video data as may serve a particular implementation. Media content provider system 204 may include one or more server-side computing devices separate from, or at least partially integrated with, those of virtual reality provider system 202.

Virtual reality provider system 202 and/or client-side system 208 may access any suitable video data representative of 2D video content from media content provider system 204. For instance, these systems may access a linearly-scheduled media content channel (e.g., a network broadcast television channel, a cable television channel, a premium channel, a pay-per-view channel, an IPTV channel, etc.) provided by a linearly-scheduled media content provider implementing media content provider system 204. In this example, the 2D video content represented by the video data may thus include a linearly-scheduled media content program being presented on the linearly-scheduled media content channel. For instance, the linearly-scheduled media content program may be a television program, a movie, or other content (e.g., including live content such as live news, a live sporting event, or the like) that airs at a particular time and date according to a predetermined schedule.

In other examples, systems 202 and/or 208 may access data representative of a non-linear media content program from a non-linear media content provider. In these examples, the 2D video content represented by the video data may thus include the non-linear media content program received from the non-linear media content provider. For example, the non-linear media content program may be a television program, a movie, or other content. Such non-linear media content may be provided by a subscription video service, a web-based on-demand video service, a provider-based video-on-demand service, or any other non-linearly scheduled video content provider as may serve a particular implementation. For instance, in one example, a movie distribution service may premier a newly released movie either at a scheduled time or on-demand during a particular time period to allow users around the world to view the movie together in one or more virtual movie theaters provided by the distribution service. In certain examples, the non-linear media content program may be or include advertising content provided by sponsors or the like.

Network 206 may provide data delivery infrastructure between server-side systems and client-side systems in the server-client data delivery architecture. As such, network 206 may include a provider-specific wired or wireless communication network (e.g., a cable or satellite carrier network or a mobile telephone network), the Internet, a wide area network, a content delivery network, and/or any other suitable network or networks, and virtual reality data may be distributed using any suitable communication technologies included within network 206. Data may flow between virtual reality provider system 202, media content provider system 204, and/or one or more client-side systems or devices such as client-side system 208 (or any component thereof) using any communication technologies, devices, media, and protocols as may serve a particular implementation.

Client-side system 208 may represent any systems or devices associated with user 214 on the client side and that are communicatively coupled (e.g., by way of network 206) with the server-side systems (e.g., virtual reality provider system 202 and/or media content provider system 204) described above. While client-side system 208 is depicted as including local media device 210 and media player device 212 in configuration 200, it will be understood that these devices represent exemplary client-side devices only and that a system of client-side devices associated with any particular user may include any number of different types of client-side devices for accessing and watching video content, accessing and experiencing virtual reality media content, and so forth.

For example, local media device 210 may represent one or more stationary or mobile devices associated with (e.g., operated by) user 214 to access and present video content such as any of the 2D video content examples described herein. Local media device 210 may thus be implemented as a set-top box (e.g., a cable or satellite set-top box configured to access cable or satellite television channels), a media channel aggregation device, a web-connected computer having a browser or other software for accessing and presenting web content, or the like. Additionally, rather than accessing video data generated elsewhere (e.g., media content provider system 204), local media device 210 may also generate video data by, for example, scanning a physical medium or accessing the video data from an integrated storage facility. For example, local media device 210 may be implemented as a digital video recorder ("DVR"), as a physical disc player (e.g., a DVD player, a BLU-RAY player, etc.), as a computing device (e.g., a laptop, a mobile device, a storage device, etc.) having video data stored thereon, or as any other device as may serve a particular implementation.

Local media device 210 may be separate from or at least partially integrated with devices used to present the video content that local media device 210 accesses or generates (e.g., televisions, computers, media player device 212, etc.). For example, a smart television may present video content and have different types of local media devices such as described above for local media device 210 built in. Similarly, a smartphone may implement both local media device 210 as well as media player device 212 to both access and present video data and/or virtual reality data to user 214.

Whether separate from or integrated with local media device 210, media player device 212 may be configured to present the persistent 3D virtual reality world represented by the virtual reality data streamed by virtual reality provider system 202 to user 214. As such, and because the video data generated by media content provider system 204 or local media device 210 is integrated with the virtual reality data, media player device 212 may be further configured to also present the 2D video content that is represented by the video data to user 214. Media player device 212 may take any of various forms including a head-mounted virtual reality device (e.g., a virtual reality gaming device), a mobile or wireless device (e.g., a smartphone, a tablet device, etc.), or any other device or configuration of devices that may serve a particular implementation to facilitate receiving and/or presenting virtual reality media content.

As described above, system 100 may perform operations including streaming virtual reality data representative of a persistent 3D virtual reality world, accessing video data representative of 2D video content, and integrating the video data with the virtual reality data such that the 2D video content is viewable by the user within the persistent 3D virtual reality world as the user experiences the persistent 3D virtual reality world. Additionally, as mentioned above, system 100 may be implemented exclusively by one or more server-side systems, exclusively by one or more client-side systems, by any suitable combination of server-side and client-side systems, or in any other manner as may serve a particular implementation.

As used herein, virtual reality data may be "streamed" when a contiguous dataset (e.g., a "data stream") representative of the virtual reality data is communicated or transferred (e.g., either by transmission or reception) while data within the contiguous dataset is being used (e.g., processed, rendered, presented, etc.). Thus, for example, virtual reality provider system 202 may be said to "stream" virtual reality data by way of a data stream 216 to be received and used by client-side system 208 and/or any component thereof (e.g., local media device 210, media player device 212, etc.). Additionally, in this configuration, client-side system 208 and its components, which are receiving data stream 216, may also be said to be "streaming" the virtual reality data included within data stream 216 as that term is used herein.

Accordingly, in some implementations, system 100 may be at least partially implemented by server-side virtual reality provider system 202, which may generate virtual reality data representative of the persistent 3D virtual reality world and may stream the virtual reality data by way of data stream 216. For instance, in these examples, virtual reality provider system 202 may perform the streaming of the virtual reality data by transmitting data stream 216, which includes the virtual reality data, to client-side system 208 (and, thus, to media player device 212). In certain such implementations, virtual reality provider system 202 may thus access the video data directly from media content provider system 204 by way of a data transfer 218-1, and may integrate the accessed video data with the virtual reality data prior to transmitting data stream 216. In some examples, virtual reality provider system 202 may access the video data by streaming the video data, while, in other examples, virtual reality provider system 202 may access the video data by downloading or otherwise accessing a static video file or the like.

In the same or other implementations, system 100 may be at least partially implemented by client-side system 208. For instance, in these implementations, a device within client-side system 208 (e.g., local media device 210, media player device 212, etc.) may perform the streaming of the virtual reality data by receiving data stream 216, which includes the virtual reality data generated and transmitted by virtual reality provider system 202. In certain such implementations, client-side system 208 may access (e.g., stream, download, etc.) video data from media content provider system 204 by way of a data transfer 218-2, and may integrate the video data with the virtual reality data included within data stream 216. Additionally or alternatively, client-side system 208 may access video data that is stored or generated locally (i.e., on the client side of network 206). For example, if local media device 210 includes a disc reader, the video data may be data decoded from a physical disc (e.g., a DVD, a BLU-RAY disc, etc.) selected by the user. Similarly, if local media device 210 or media player device 212 has video data stored on local storage facilities (e.g., hard drives, etc.) included therein, the video data may be video data accessed from the local storage facilities such that no video data from media content provider system 204 may be employed in these examples.

As mentioned above, user 214 may engage in a virtual reality experience using a device such as media player device 212. To illustrate, FIG. 3 shows exemplary aspects of presenting a persistent 3D virtual reality world to user 214 by way of media player device 212.

Figure 3:
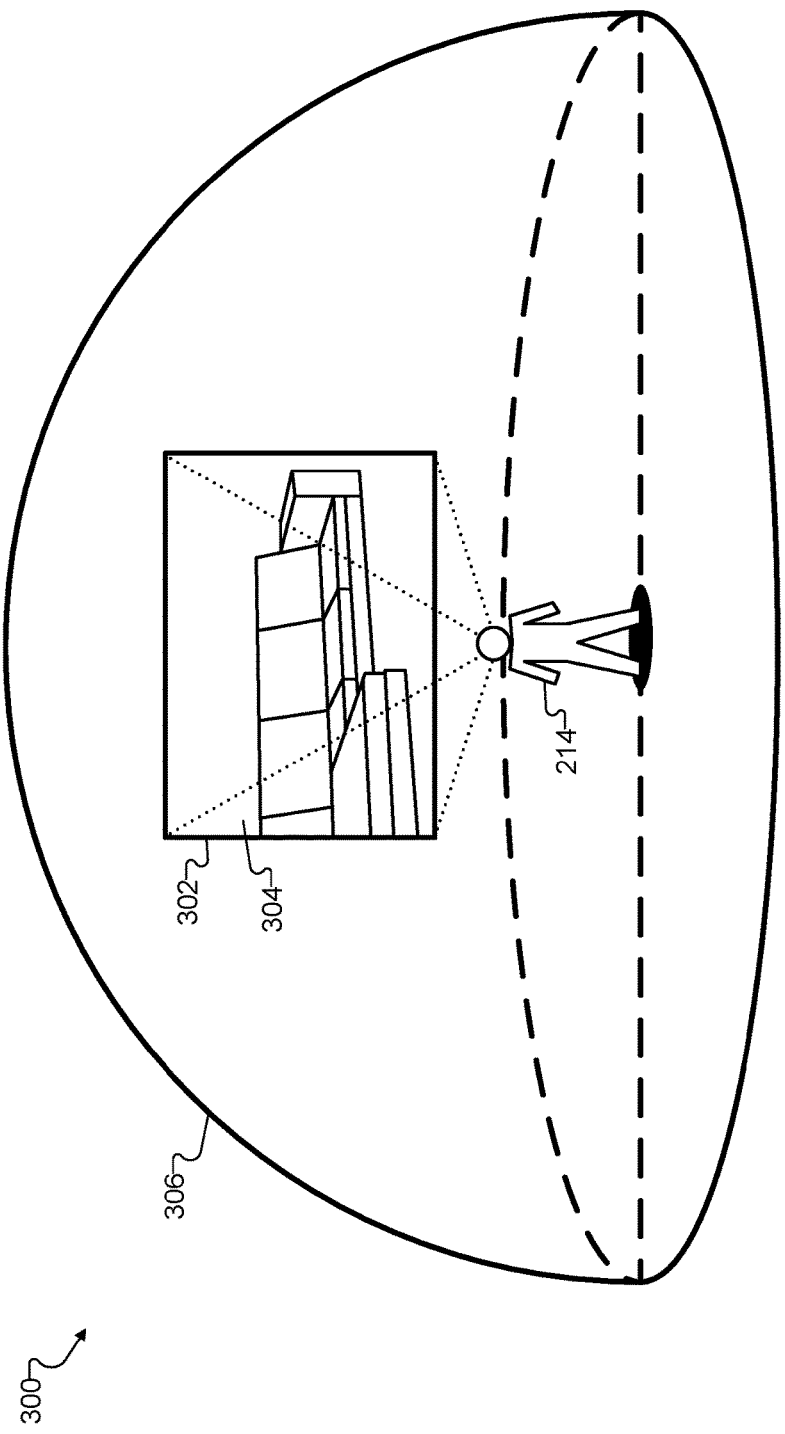
FIG. 3 illustrates exemplary aspects of presenting a persistent 3D virtual reality world to a user by way of a media player device according to principles described herein.

Specifically, FIG. 3 illustrates an exemplary virtual reality experience 300 in which user 214 is presented with an exemplary field of view 302 that includes content 304 of an exemplary persistent 3D virtual reality world 306 ("world 306"). User 214 may experience world 306 by providing user input to media player device 212 in order to dynamically change field of view 302 to display whatever content within world 306 that user 214 wishes to view. For example, the user input provided by user 214 may include an indication that user 214 wishes to look at content not currently presented within field of view 302 (i.e., content of world 306 other than content 304). If media player device 212 includes sensors (e.g., motion, direction, and/or orientation sensors) such as may be the case for a head-mounted virtual reality device, a mobile device, or the like, this user input may, for example, include a change to an orientation of the display screen of media player device 212 brought about by a movement of the head of user 214. Media player device 212 may be configured to detect the change to the orientation of the display screen as user 214 experiences world 306, and the dynamic changing of the content includes gradually replacing content 304 with other content of world 306 that is determined to be visible from a viewpoint of user 214 within world 306 according to the detected change to the orientation of the display screen.

In FIG. 3, world 306 is illustrated as a semi-sphere, indicating that user 214 may look in any direction that is substantially forward, backward, left, right, and/or up. However, if user 214 directs field of view 302 down, field of view 302 may present a still image representative of the ground of world 306, a black screen, a menu, one or more virtual objects, or any other suitable image that may serve a particular implementation. In other examples, world 306 may be implemented as a full sphere so that every direction in which user 214 may direct field of view 302 is associated with dynamic and/or real-world content of world 306.

FIG. 3 illustrates how user 214 may experience world 306 by way of field of view 302, which may be directed to look around world 306 from the vantage point of user 214 within world 306. It will be understood that world 306 and other 3D virtual reality worlds described herein may be experienced in this way. However, to illustrate particular aspects of a persistent 3D virtual reality world, FIGS. 4-7 and 9 described below illustrate exemplary perspective views of persistent 3D virtual reality worlds as presented to users experiencing the persistent 3D virtual reality worlds. Thus, while perspective views illustrated herein may not necessarily equate with what user 214 actually sees in field of view 302 at any given time, it will be understood that user 214 may look around the illustrated persistent 3D virtual reality worlds to see the objects and aspects illustrated and described below from a particular vantage point within the persistent 3D virtual reality world (e.g., a vantage point of an avatar of user 214).

Figure 4:
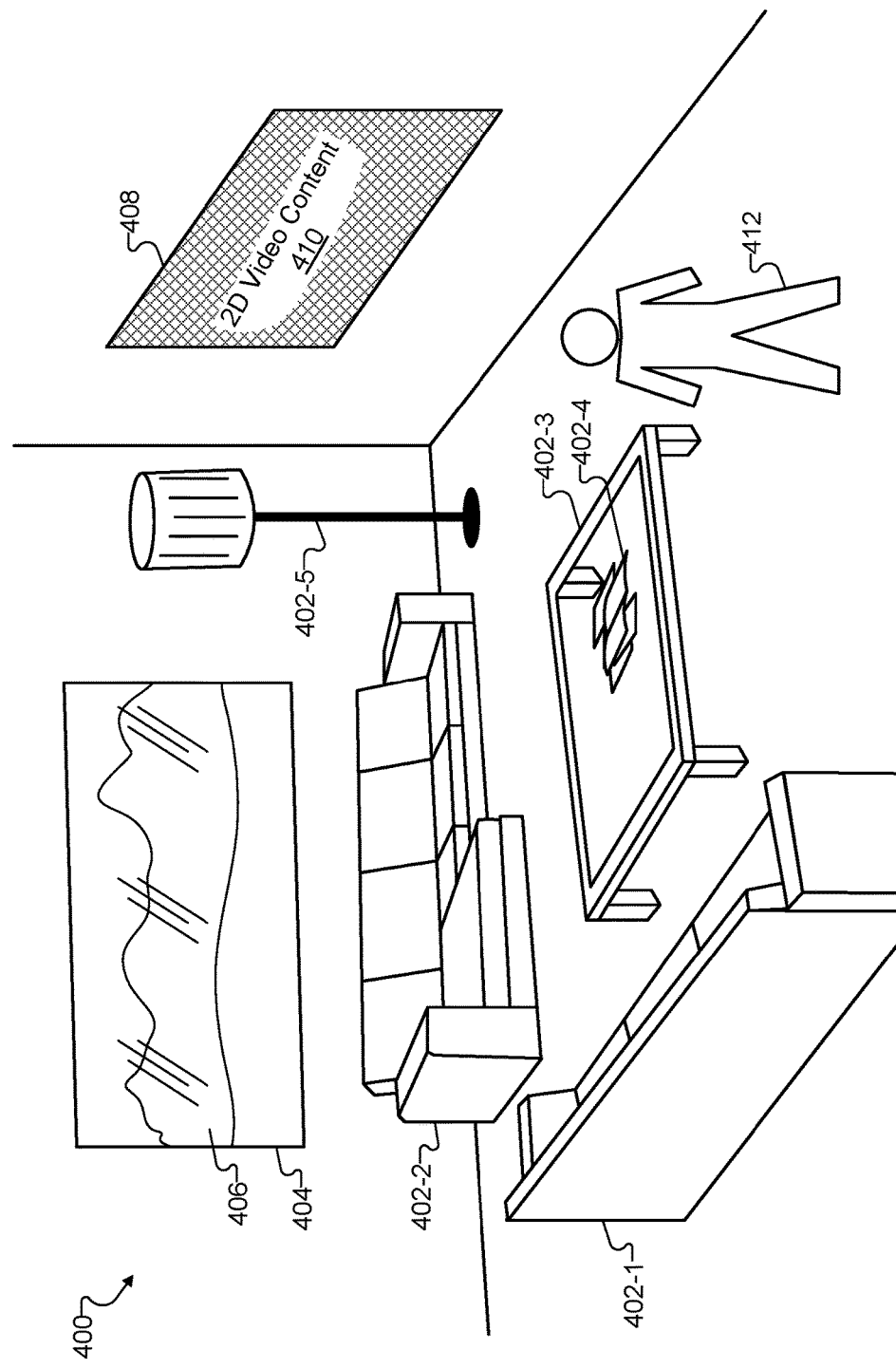
FIGS. 4-7 illustrate exemplary perspective views of a persistent 3D virtual reality world as presented to a user experiencing the persistent 3D virtual reality world according to principles described herein.

FIG. 4 illustrates a perspective view of a persistent 3D virtual reality world 400 ("world 400") associated with a viewing lounge. As shown, world 400 includes a plurality of virtual objects 402 (e.g., virtual objects 402-1 through 402-5) including a sofa 402-1, a sectional 402-2, a coffee table 402-3, a stack of magazines 402-4, and a lamp 402-5. While other virtual objects are not explicitly labeled or shown in FIG. 4, it will be understood that various additional virtual objects could also be included within world 400 to make the viewing lounge comfortable and attractive to user 214. Along with virtual objects 402, world 400 also includes a picture window 404 providing a scenic view 406 of an outdoor scene along one wall, and a virtual screen 408 upon which 2D video content 410 is presented along another wall.

FIG. 4 also illustrates an avatar 412 of user 214 that represents user 214 within world 400. For example, the vantage point from which field of view 302 is presented may be associated with the location of avatar 412 within world 400 and user 214 may be visible to other users experiencing world 400 by way of avatar 412.

World 400 and the objects and other components included therein may be generated in any way and based on any scenery or objects as may serve a particular implementation. For example, world 400 may be based on a live (e.g., real-time) feed of camera-captured scenery of a real-world scene. For instance, world 400 may be based on a real-world VIP viewing lounge at a live sporting event (e.g., a professional football game) where the sporting event may be taking place on a field visible from picture window 404 and a 2D televised broadcast of the game may be presented as 2D video content 410 on virtual screen 408. In this example, real people present at the real-world VIP viewing lounge (e.g., celebrities, players' families, etc.) may thus be seen in real time by user 214 within world 400.

As another example, world 400 may be based on camera-captured scenery of a real-world scene captured previously, or a completely virtualized (e.g., animated) world that is not based on camera-captured scenery but, rather, is entirely computer generated. For example, a real VIP viewing lounge may be captured at a time when no one is present within it and used for world 400, or an imaginary, virtualized viewing lounge may be generated and used for world 400.

User 214 may view and interact with various objects included in world 400 by way of avatar 412 as user 214 experiences world 400. For example, user 214 may cause avatar 412 to move across the room to better see scenic view 406 from picture window 404, to manipulate lamp 402-5 to adjust lighting conditions within world 400, to pick up one of magazines 402-4 to view the cover or read the contents of an article, and so forth. As another example, user 214 may cause avatar 412 to be seated on sofa 402-1 or sectional 402-2 so as to obtain a good view of 2D video content 410 on virtual screen 408.

As mentioned above, system 100 may integrate accessed video data with streaming virtual reality data such that 2D video content is viewable by a user within a persistent 3D virtual reality world as the user experiences the persistent 3D virtual reality world. Virtual screen 408 illustrates an exemplary result of this integration of video data and virtual reality data. Specifically, the integrating of the video data with the virtual reality data may include virtually projecting 2D video content 410 onto virtual screen 408 within world 400 such that user 214 can watch 2D video content 410 from the vantage point of avatar 412 within world 400 (e.g., from sofa 402-1, sectional 402-2, or the like).

To this end, virtual screen 408 may be an actual screen captured in a real-world scene upon which world 400 is based, or may be inserted as a virtual object into world 400 in any manner as may serve a particular implementation. For example, a virtual object having a quadrilateral (e.g., rectangular) or other suitable shape (e.g., oval, circular, etc.) may be positioned within world 400 according to any of various suitable display parameters such as positional parameters indicating where the virtual object is to be positioned, orientation parameters indicating how the virtual object is to be oriented (e.g., which direction the virtual object is to be facing), scaling parameters indicating how large the virtual object is to appear, and so forth. This virtual object may be integrated with real objects (i.e., camera-captured objects) or other virtual objects to implement virtual screen 408. 2D video content 410 including any of the video content described herein may then be virtually projected onto (i.e., displayed on) virtual screen 408 such that virtual screen 408 acts like a virtual television or video projection screen within world 400.

System 100 may integrate video data representative of 2D video content 410 with virtual reality data representative of various aspects of world 400 (e.g., objects 402, picture window 404, scenic view 406, virtual screen 408, avatar 412, etc.) to provide the persistent 3D virtual reality world for user 214 to experience. As used herein, a "persistent 3D virtual reality world" is a 3D virtual reality world, such as world 400 illustrated in FIG. 4, that is streamed to a media player device of a user such as user 214 upon request, and that is persistently maintained (e.g., continuously updated, available to be streamed by other users, etc.) independently of whether the user is experiencing the world at any given time.

In some examples, virtual reality data representative of persistent 3D virtual reality worlds may thus be fundamentally different from virtual reality data representative of other types of conventional virtual reality worlds in various ways. For example, conventional technologies stream virtual reality worlds by virtualizing hardware and software needed to process and render the virtual reality worlds. As such, when a conventional service provides a streaming virtual reality world to a user using this virtualization paradigm, there may be a virtualization of hardware and software of a virtual reality presentation system (e.g., a gaming PC loaded with software representative of the virtual reality world) that exists within the cloud (i.e., exists on one or more servers with which a media player device used by the user is communicating by way of a network). The virtualized system may be dedicated to providing a virtual reality world to a particular user and may thus correspond to the media player device used by the user in a one-to-one fashion. For example, user inputs may be communicated from the media player device to the cloud-based virtualization system and a video stream may be communicated from the virtualization system back down to the media player device.

As a result, users experiencing a virtual reality world by way of this conventional paradigm may be assigned such cloud-based virtualizations of virtual reality presentations systems, and each system may provide a respective user with virtual reality content in essentially the same way that a system would if it were localized to the user, rather than in the cloud. For example, even though a particular user may receive virtual reality data in a stream (e.g., from the cloud) rather than from a local virtual reality presentation system (e.g., a gaming PC owned by the particular user), the software running on the respective virtualized system assigned to the particular user must be compiled, built, and distributed to be run and used by the user. Consequently, just as with non-streamed virtual reality data that is processed and rendered locally, changing aspects of virtual reality data streamed in this conventional way (e.g., aspects such as the presence, behavior, functionality, appearance, etc., of objects within the virtual reality world) may require recompilation, rebuilding, and redistribution of the virtual reality data loaded onto the virtualized system. At the very least, a software patch or the like would need to be distributed and installed by each virtualized system streaming the conventional virtual reality world.

In contrast, virtual reality data representative of persistent 3D virtual reality worlds such as described herein may be configured for one-to-many streaming by using a one-to-many stateful paradigm that is fundamentally different from the one-to-one paradigm described above. Rather than loading software representative of the virtual reality world onto dedicated, one-to-one virtualizations of virtual reality presentation systems as described above, a single system maintaining a world state of a persistent 3D virtual reality world (e.g., data representative of which objects are within the world, where the objects are disposed within the world, how the objects are moving and/or interacting within the world, etc.) may deliver the same state information to many different clients (e.g., media player devices of different users) that may perform the processing and rendering on their own (e.g., or by offloading certain tasks to edge servers relatively close to the client as latency limitations may allow). Accordingly, virtual reality data representative of persistent 3D virtual reality worlds may be broadcast or multicast to many client devices simultaneously to allow many users to jointly experience the persistent 3D virtual reality world while only one instance of the world is maintained (e.g., rather than many different instances of the world being maintained on individual virtualized systems, as described above). Additionally, as these persistent 3D virtual reality worlds are continuously streamed, all aspects of the appearance and functionality of the persistent 3D virtual reality worlds and components therein may be modular, open, dynamic, and modifiable at run time.

As such, one benefit of persistent 3D virtual reality worlds (e.g., virtual reality worlds streamed using a stateful, one-to-many paradigm such as described above) is that 3D virtual reality worlds may be dynamically changed (e.g., on the fly, at run time as the virtual reality data is streaming) in various ways without the virtual reality data representative of persistent 3D virtual reality worlds being recompiled, rebuilt, or even updated by way of a software patch or the like. For example, as the virtual reality data of persistent 3D virtual reality worlds is streaming, a provider of the virtual reality data may be able to freely add or remove objects from the worlds, add games that may be played by users, update or adjust the code on which the world is running (e.g., to add new features or functionality, to fix bugs, etc.), change the functionality of the worlds (e.g., modify the physics of the worlds, etc.), and/or otherwise dynamically contextualize the worlds in any suitable way.

Another benefit of persistent 3D virtual reality worlds is that virtual reality data of such worlds may be broadcast to many users at once without requiring dedicated virtualizations of hardware and software to be assigned and reserved for all of the users. In some examples, various different persistent 3D virtual reality worlds offered by a provider may be broadcast to a subscriber base of many users as virtual reality experience options. As such, users in the subscriber base may instantly switch from world to world in an analogous way as users may switch through different television channels. Like television channels, various 3D virtual reality worlds may persistently exist and be persistently provided to users as options to experience regardless of which worlds (if any) the users actually select and experience. Also analogous to television channel surfing, media player devices used to instantly switch from world to world in this way may not store or receive any data related to the different persistent 3D virtual reality worlds prior to presenting the worlds to respective users. All the data needed to process, render, and present a particular persistent 3D virtual reality world to the user may be provided at run time when the world is selected.

One-to-many streaming by way of the stateful, one-to-many paradigms described above may be performed by server-side systems (e.g., systems associated with or included within virtual reality provider system 202) in any of the examples described herein. As such, one-to-many paradigms may provide a server-client streaming alternative to conventional one-to-one streaming paradigms for the reasons described above. However, it will be understood that a one-to-many paradigm similar or identical to that described above may similarly be implemented by client-side systems (e.g., by client-side system 208 and/or any device included therein) to provide virtual reality data representative of a persistent 3D virtual reality world to one or more media player devices at the same time. As such, for example, multiple users in a household may each experience media content (e.g., streaming from an external source or an internal source such as a physical disc reader or local media storage device) together from within a persistent 3D virtual reality world generated and streamed locally by a client-side system such as a set top box.

Objects, behaviors, functionality, etc., of world 400 may be dynamically modified in any way as a provider of the virtual reality data (e.g., virtual reality provider system 202) may see fit. For example, in certain implementations, dynamic modifications to world 400 may operate to contextualize world 400 in relation to 2D video content 210. For example, world 400 may appear as illustrated in FIG. 4 while a particular media program is being presented within 2D video content 410. However, when the media program is interrupted by a commercial break, world 400 may be dynamically modified or contextualized in various ways in accordance with the context of different content presented during the commercial break.

Such contextualization may take any form as may serve a particular implementation. As one example of contextualization, for instance, a size of virtual screen 408 onto which 2D video content 410 is virtually projected (i.e., on which 2D video content 410 is displayed) may dynamically change in accordance with context of 2D video content 410. For example, virtual screen 408 may become larger or may take a different form factor (e.g., become wider, taller, etc.) to appropriately present certain aspects of a particular advertisement or other 2D video content. In some instances, virtual screen 408 may even expand to surround avatar 412 on all sides such that 360° 2D video content wrapped around virtual screen 408 may be presented. Specifically, virtual screen 408 may be a quadrilateral-shaped screen in accordance with context of a first portion of 2D video content 410 (as shown in FIG. 4), and the size of virtual screen 408 may undergo the dynamic change in accordance with context of a second portion of 2D video content 410 (e.g., a second portion temporally subsequent to the first portion of the 2D video content) to become a 360° screen surrounding the user. Such changes may be temporary (e.g., associated with particular content segments, advertisements, etc.) so that virtual screen 408 may later return to a standard size when the context of 2D video content 410 changes again (e.g., returns to normal after the particular content segment, advertisement, etc.).

As another example of contextualization, system 100 may integrate object data with the virtual reality data and the video data while the virtual reality data is streaming so as to dynamically modify an aspect of world 400 as the user experiences world 400. For instance, the object data may cause the aspect of world 400 to be modified at runtime in accordance with a context of 2D video content 410. To this end, object data may include data configured to modify any suitable aspect of world 400 as may serve a particular implementation. For example, object data may include data representative of one or more additional (e.g., new) virtual objects to be disposed in world 400; data representative of modifications to be made to the appearance, behavior, or functionality of objects within world 400; data representative of games that may be played or other experiences that may be offered within world 400; data representative of new or modified logic or code upon which world 400 is to be run; and/or any other data that may implement additions or changes to world 400 and/or the objects presented or functionality offered within world 400 as may serve a particular implementation.

In some examples, by integrating object data into the virtual reality data while the virtual reality data is streaming, a virtual object represented by the object data (e.g., a virtual object that is contextually associated with 2D video content 410) may be viewable by user 214 within world 400 as user 214 experiences world 400. In other examples, games or other experiences that are contextually associated with 2D video content 410 may be offered to be experienced by user 214 within world 400 as user 214 experiences world 400. In each of these and other examples, objects, behaviors, functionalities, and so forth that relate to a particular content segment (e.g., a media program, an advertisement, etc.) being presented as part of 2D video content 410 may not only be shown on screen 408, but may also become a part of world 400 for at least a period of time (e.g. while the content segment is ongoing).

Figure 5:
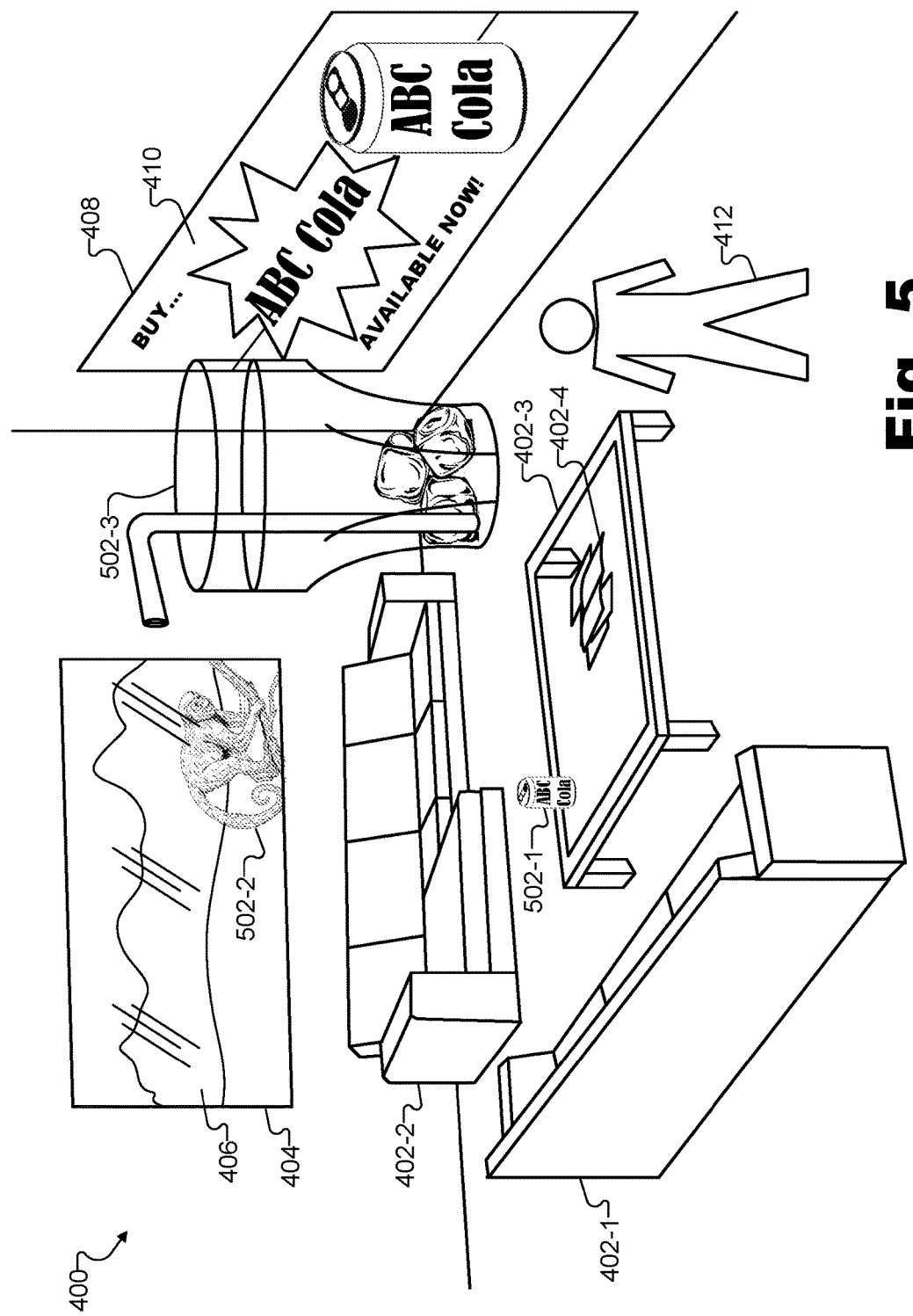

To illustrate, FIG. 5 shows a dynamic contextualization of world 400 in accordance with a particular advertisement that is presented as part of 2D video content 410. Specifically, as shown, an advertisement for a particular brand of soda called "ABC Cola" may be presented within 2D video content 410. In response, various objects are shown to be added or modified to contextualize world 400 to this content. For example, virtual screen 408 is shown to be significantly larger than it was previously (see FIG. 4) to highlight ABC Cola and draw the attention of user 214. Additionally, new virtual objects 502 including a can of soda 502-1, a mascot character 502-2 (e.g., a monkey) outside the window, and a glass of soda 502-3 are also dynamically added to world 400.

Objects 502 may relate to the advertisement in any suitable way. For example, as shown, can of soda 502-1 may be explicitly labeled to be the ABC Cola brand, mascot character 502-2 may be a well-known mascot for the ABC Cola brand, and glass of soda 502-3 may depict the soda product itself in an enticing way to induce user 214 to desire to drink ABC Cola. As shown, objects 502 may be added where no objects existed before (e.g., such as is the case with can of soda 502-1 and mascot character 502-2), or may replace objects that are not particularly relevant or important at the moment (e.g., such as is the case with glass of soda 502-3, which is shown to have replaced lamp 402-5).

FIG. 5 illustrates a relatively simple example of how world 400 may be contextualized for a specific tie-in to the 2D content, but it will be understood that in various examples, persistent 3D virtual reality worlds may be contextualized in any manner as may serve a particular implementation. For instance, in some implementations, an entire room may be transformed in accordance with a content segment being presented in 2D video content 410. If a particular restaurant or bar sponsors a particular media program being presented, for example, world 400 may be modified so as to mimic the look and feel of the restaurant or bar itself (e.g., including branded merchandise distributed around the room, etc.) throughout the entire media program. In this way, user 214 may feel as if he or she is watching the media program from the enjoyable and dynamic environment that the restaurant or bar is associated with providing.

In other examples, interactive elements such as mini-games, user-selectable presentation options, etc., may be presented within world 400 to further enhance the user's experience and/or further optimize sponsors' ability to engage viewers with their products. For instance, within the context of a persistent 3D virtual reality world implemented as a sports lounge in which a basketball game is being viewed by users on a virtual screen, a virtual free-throw contest game may be offered to engage users at half time. As another example, a virtualized basketball player (e.g., a 3D model of a specific star player on one of the teams in the basketball game being presented on the virtual screen) may appear in the virtual sports lounge for the users to see and/or interact with (e.g., take virtual photos with, etc.). Various other examples and experiences may similarly be provided in various other contexts as may serve a particular implementation.

Figure 6:
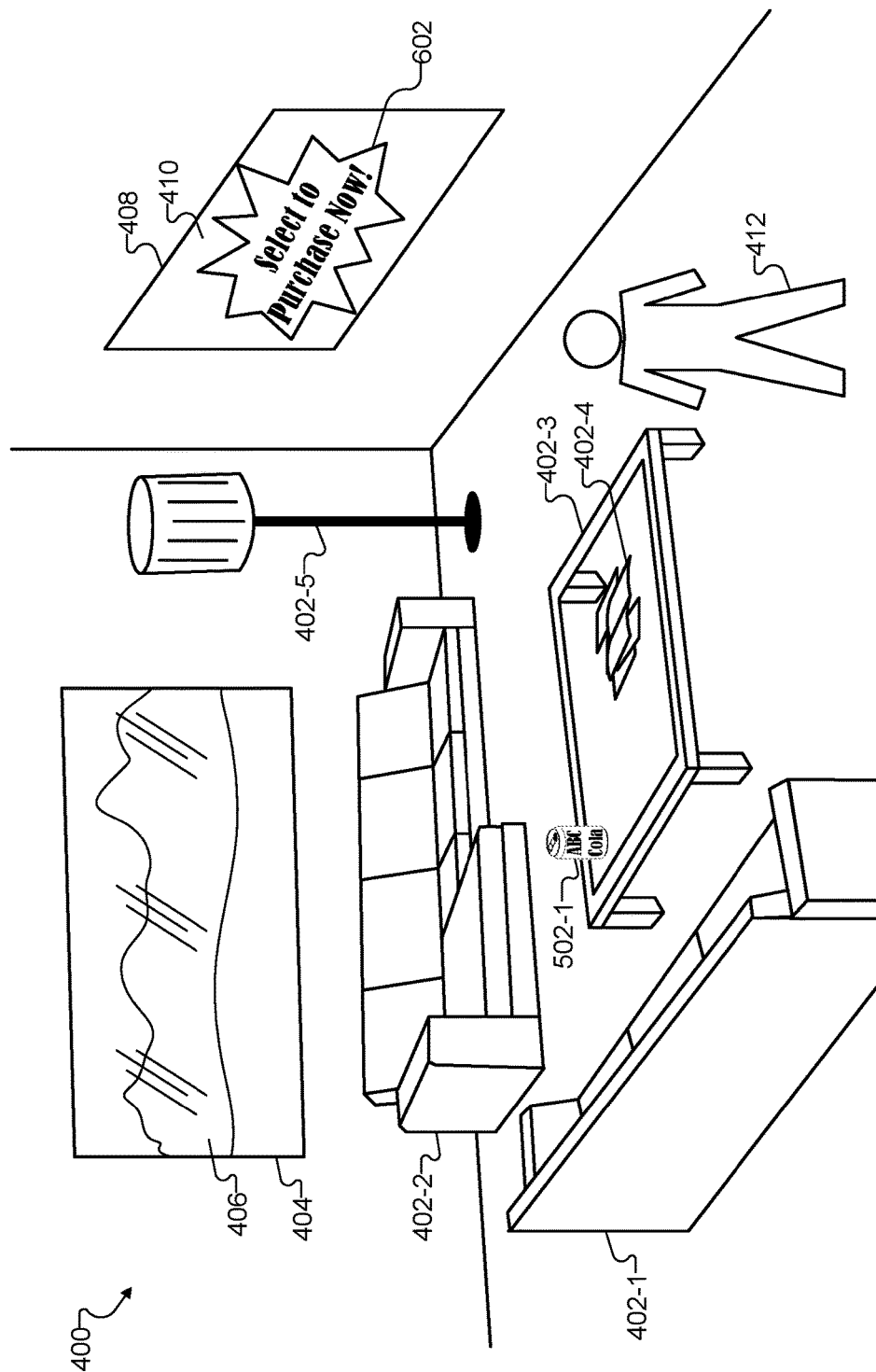

After a particular content segment is over, world 400 may be modified or contextualized to again take a more standard form. For example, as shown in FIG. 6, after the directed content for ABC Cola is over, mascot character 502-2 may no longer be seen out of picture window 404, lamp 402-5 may again replace glass of soda 502-3, virtual screen 408 may return to its standard (smaller) size on the wall, and so forth. However, in some examples, certain elements of the contextualization may persist even after the content segment is over. For instance, as shown, can of soda 502-1 may remain on coffee table 402-3 as a continued reminder to user 214 of the ABC Cola advertisement that was presented.

In some implementations, it may be possible, from within world 400, for user 214 to engage in additional behaviors (e.g., other than watching television) that have conventionally been engaged in only from the real world. For example, as user 214 experiences world 400, system 100 may provide a virtual commerce transaction option within world 400 to allow user 214 to virtually engage in a real-world e-commerce transaction. Specifically, if the virtual commerce transaction option is selected by the user, the virtual commerce transaction may be configured to initiate an exchange of real-world money between the user and another party represented within world 400 (e.g., a party associated with an advertisement being presented such as ABC Cola in the example of FIG. 5).

To illustrate, FIG. 6 illustrates a virtual commerce transaction option 602 presented on virtual screen 408 within world 400 to allow user 214 to purchase something using real-world money (e.g., stored within an account of user 214 or the like) without leaving world 400. For instance, virtual commerce transaction option 602 may be presented as an option after an advertisement has been presented as part of 2D video content 410 to allow user 214 to purchase the product that was advertised. For example, if a pizza chain was advertised as part of a commercial break during 2D video content 210, virtual commerce transaction option 602 may allow user 214 to directly order one or more pizzas for delivery to his or her real-world location. Additionally or alternatively, virtual commerce transaction option 602 may be associated with in-world micro-transactions allowing user 214 to purchase, for example, an improved avatar 412 or accessories (e.g., clothing, etc.) for avatar 412, access to mini-games or other functionality, customized decor to personalize world 400, or the like.

Along with augmenting the television watching experience of user 214 by contextualizing world 400 to 2D video content 410 by adding objects and functionality and the like, system 100 may also augment the content viewing experience in other ways to further benefit user 214 and/or enhance world 400. For example, along with accessing the video data representative of 2D video content 410, system 100 may further access additional video data representative of additional 2D video content different from 2D video content 410. For example, if the video data representative of 2D video content 410 includes one linearly-scheduled media content channel presenting one linearly-scheduled media content program, the additional video data may be representative of a different linearly-scheduled media content channel presenting a different linearly-scheduled media content program. System 100 may then integrate the additional video data with the virtual reality data while the virtual reality data is streaming and the original video data (i.e., representative of 2D video content 410) is also integrated with the virtual reality data. In this way, in addition to 2D video content 410 being viewable by user 214, the additional 2D video content may also be viewable by user 214 within world 400 as user 214 experiences world 400.

Figure 7:
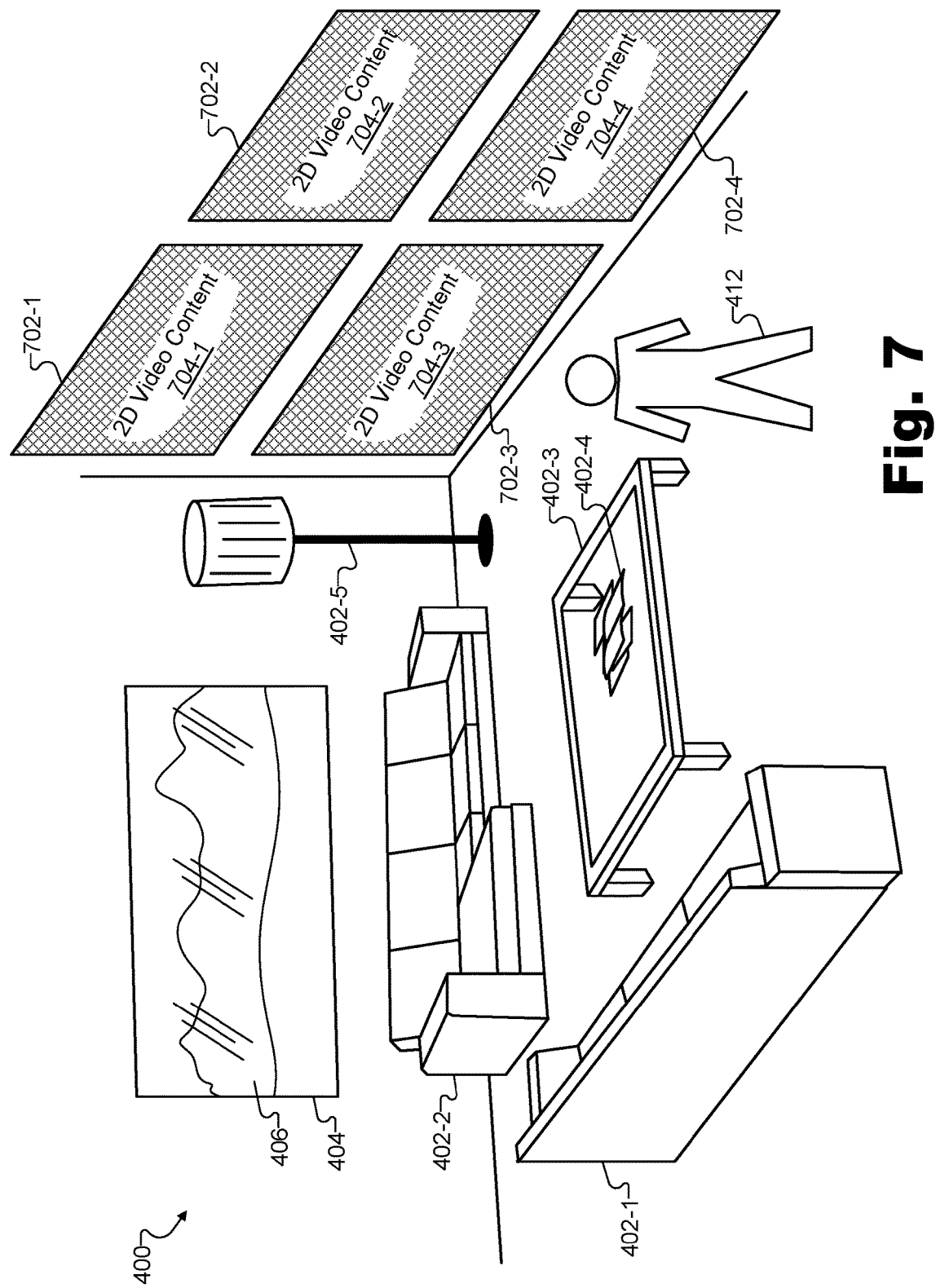

To illustrate, FIG. 7 depicts world 400 in an implementation or at a particular time in which multiple instances of different 2D video content are presented on separate virtual screens within world 400 simultaneously. Specifically, as shown, a plurality of virtual screens 702 (e.g., virtual screens 702-1 through 702-4) have replaced single virtual screen 408 along a wall of world 400. Each virtual screen 702 may include different 2D video content 704 (e.g., 2D video content 704-1 through 704-4, respectively, for virtual screens 702-1 through 702-4). For example, as mentioned above, different linearly-scheduled media programs being presented on different linearly-scheduled media channels may be included within each 2D video content 704, or any other type of 2D video content mentioned herein or as may serve a particular implementation.

By presenting different 2D video content on adjacent screens in this way, user 214 may be able to easily keep track of what is happening in various media programs at once (e.g., keeping track of several sporting events that are occurring at the same time, etc.). Additionally, presenting different 2D video content on multiple virtual screens may enhance the realism and immersiveness of worlds configured to mimic real-world locations such as bars and restaurants where multiple media programs often are shown on multiple screens at once.

Another advantage of including multiple virtual screens 702 within world 400 may relate to instances where more than one user is experiencing world 400 at the same time, because different users may choose to focus on different 2D video content 704 while still having the feeling that they are in a common location spending time together. As mentioned above, because world 400 persists even in an absence of user 214 experiencing world 400, other users besides user 214 may also stream and experience world 400 using their own respective media player devices regardless of whether user 214 is also experiencing world 400 at the time.

More particularly, the streaming of the virtual reality data performed by system 100 may include (e.g., may be performed by) transmitting a first data stream including the virtual reality data to media player device 212 associated with user 214 and transmitting a second data stream including the virtual reality data (e.g., the same portions and/or different portions of the virtual reality data as included within the first data stream) to an additional media player device used by an additional user. Accordingly, world 400 may be further configured to be experienced (e.g., independently of whether user 214 is experiencing world 400) by the additional user using the additional media player device while the virtual reality data is streaming.

Figure 8:
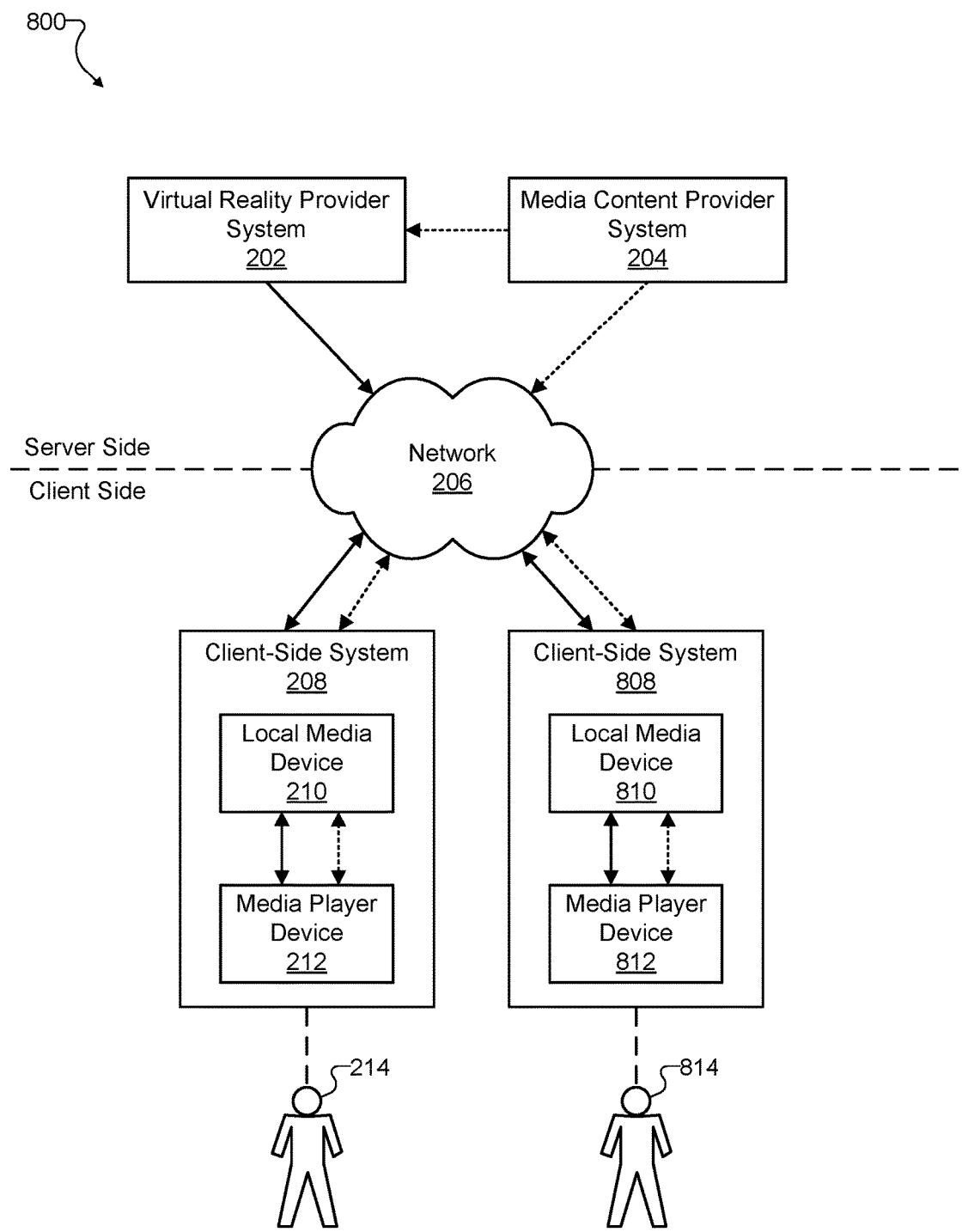
FIG. 8 illustrates an exemplary configuration in which the virtual reality presentation system of FIG. 1 may be implemented to present a video stream within a persistent 3D virtual reality world that is shared by a plurality of users according to principles described herein.

To illustrate, FIG. 8 shows an exemplary configuration 800 in which system 100 may be implemented to present a video stream within a persistent 3D virtual reality world that is shared by a plurality of users. Specifically, as with configuration 200 illustrated above in relation to FIG. 2, configuration 800 includes virtual reality provider system 202 and media content provider system 204 on the server side of network 206, with client-side system 208, including local media device 210 and media player device 212, on the client side of network 206. All of these components may operate to provide a virtual reality experience within a persistent 3D virtual reality world for user 214 as described above.

However, in contrast with configuration 200, configuration 800 further includes additional components numbered in an analogous fashion to corresponding components from configuration 200, which may operate in similar or the same ways as described herein. Specifically, configuration 800 includes a client-side system 808 that includes a local media device 810 and a media player device 812, either or both of which are associated with (e.g., owned and/or operated by) a user 814. In configuration 800, system 100 may be implemented by server-side or by client-side components as described above in relation to configuration 200. However, the virtual reality data provided to each of client-side systems 208 and 808 may be representative of the same persistent 3D virtual reality world so as to allow both user 214 and user 814 to experience the same persistent 3D virtual reality world.

Accordingly, various social aspects to the persistent 3D virtual reality world may be provided to users 214 and 814 that may not be possible in conventional virtual reality worlds. For example, user 214 may customize (e.g., build, decorate, etc.) a persistent 3D virtual reality world that he or she may invite user 814 to experience together with user 214. When both users are experiencing the persistent 3D virtual reality world at the same time, they may also see one another (e.g., by way of respective avatars included within the world) and/or interact in any manner as may serve a particular implementation.

Figure 9:
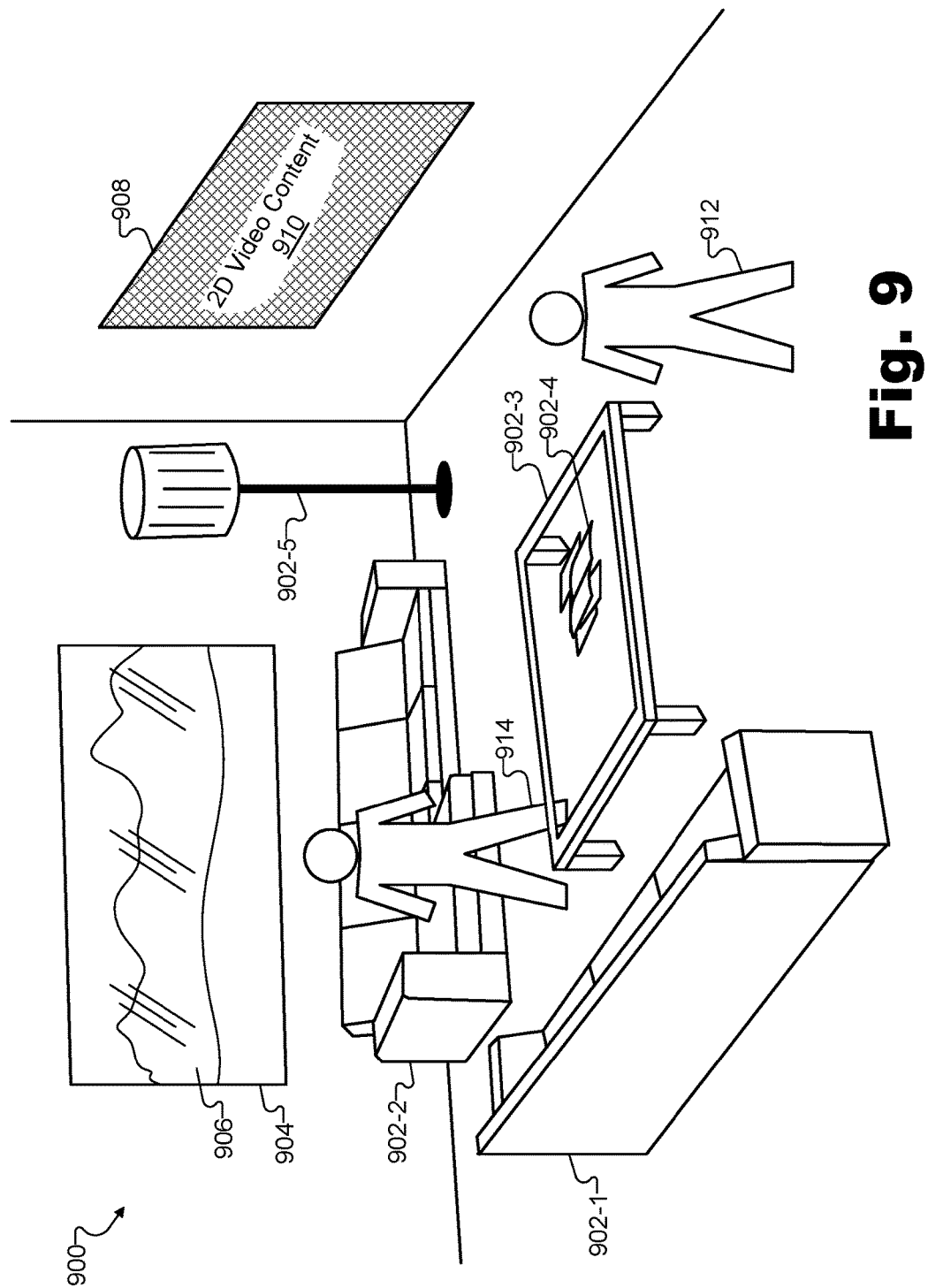
FIG. 9 illustrates an exemplary perspective view of a shared persistent 3D virtual reality world as presented to a plurality of users experiencing the shared persistent 3D virtual reality world according to principles described herein.

To illustrate, FIG. 9 shows an exemplary perspective view of a shared persistent 3D virtual reality world 900 ("world 900") as presented to a plurality of users experiencing the shared persistent 3D virtual reality world together. As shown, world 900 may have many of the same objects and aspects illustrated and described above in relation to world 400. For example, world 900 may include virtual objects 902-1 through 902-5 (corresponding to virtual objects 402-1 through 402-5, respectively), a picture window 904 overlooking a scenic view 906 (corresponding to picture window 404 and scenic view 406), and a virtual screen 908 upon which 2D video content 910 is presented (corresponding to virtual screen 408 and 2D video content 410). Additionally, like world 400, world 900 may include an avatar 912 (corresponding to avatar 412) to represent user 214. As shown, world 900 may further include another avatar 914 to represent user 814.

Users 214 and 814 may interact within world 900 by way of respective avatars 912 and 914 in any suitable way. For example, both users may cause their respective avatars to sit next to one another on sofa 902-1 to watch 2D video content 910 together, giving each the sensation that they are watching television together even though user 214 may actually be remote from user 814 in the real-world. Additionally, users 214 and 814 may communicate with one another by any suitable form of telecommunication, and respective avatars 912 and 914 may be made to appear as if they are saying the words spoken by users 214 and/or 814 as appropriate. Users 214 and 814 may further interact by competing in mini-games (e.g., games contextualized to relate to advertisements during a commercial break, games purchased by way of virtual commerce transactions, etc.) or in any other manner as may serve a particular implementation.

Figure 10:
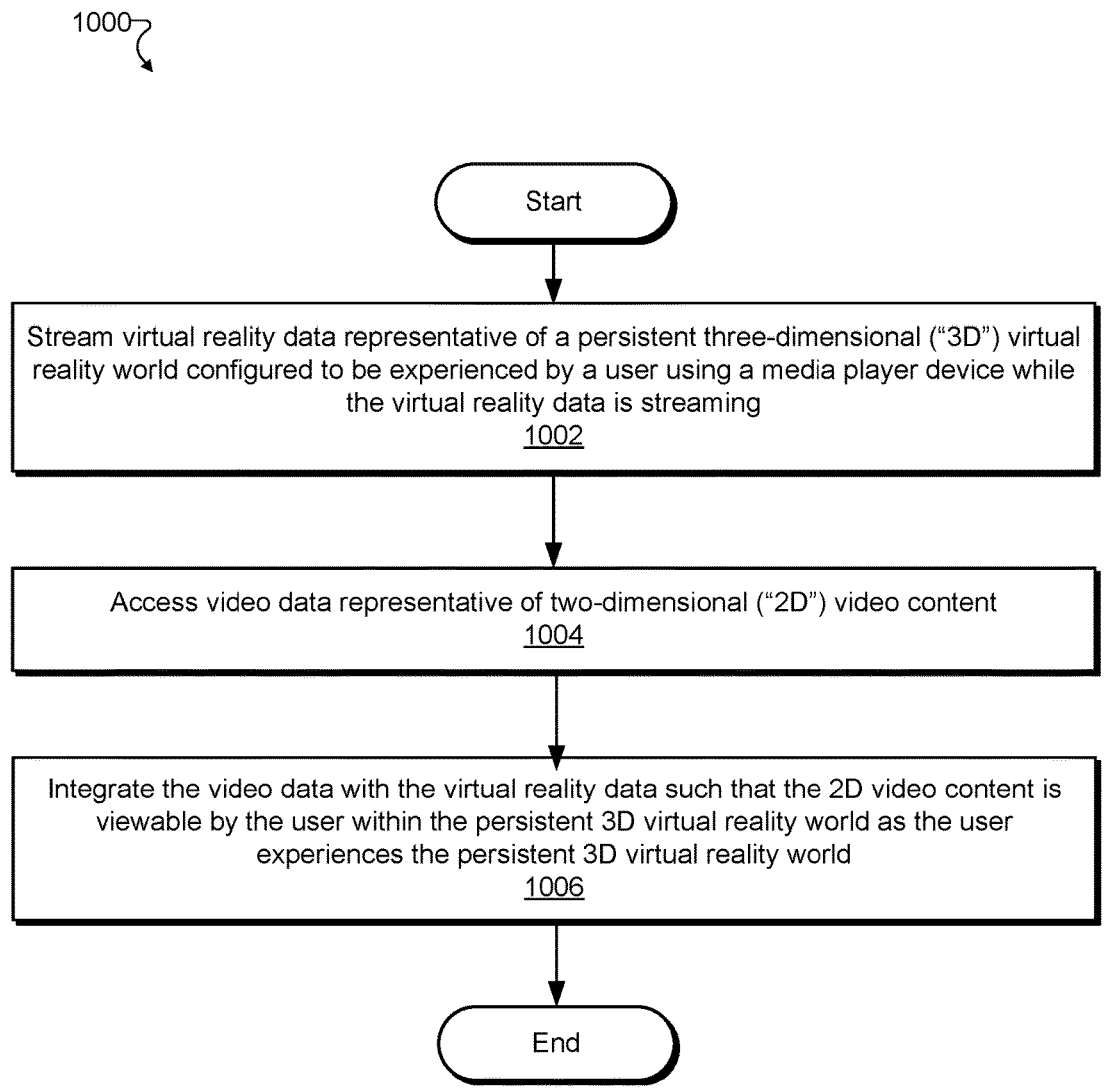
FIGS. 10-11 illustrate exemplary methods for presenting a video stream within a persistent 3D virtual reality world according to principles described herein.

FIG. 10 illustrates an exemplary method 1000 for presenting a video stream within a persistent 3D virtual reality world. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a virtual reality presentation system may stream virtual reality data representative of a persistent 3D virtual reality world configured to be experienced by a user using a media player device while the virtual reality data is streaming. In some examples, the persistent 3D virtual reality world may be configured for one-to-many streaming and configured to dynamically persist independently of whether the user is experiencing the persistent 3D virtual reality world. Operation 1002 may be performed in any of the ways described herein.

In operation 1004, the virtual reality presentation system may access video data representative of 2D video content. Operation 1004 may be performed in any of the ways described herein.

In operation 1006, the virtual reality presentation system may integrate the video data with the virtual reality data such that the 2D video content is viewable by the user within the persistent 3D virtual reality world as the user experiences the persistent 3D virtual reality world. In some examples, the virtual reality presentation system may integrate the video data with the virtual reality data while operation 1002 is ongoing (e.g., while the virtual reality data is streaming). Operation 1006 may be performed in any of the ways described herein.

Figure 11:
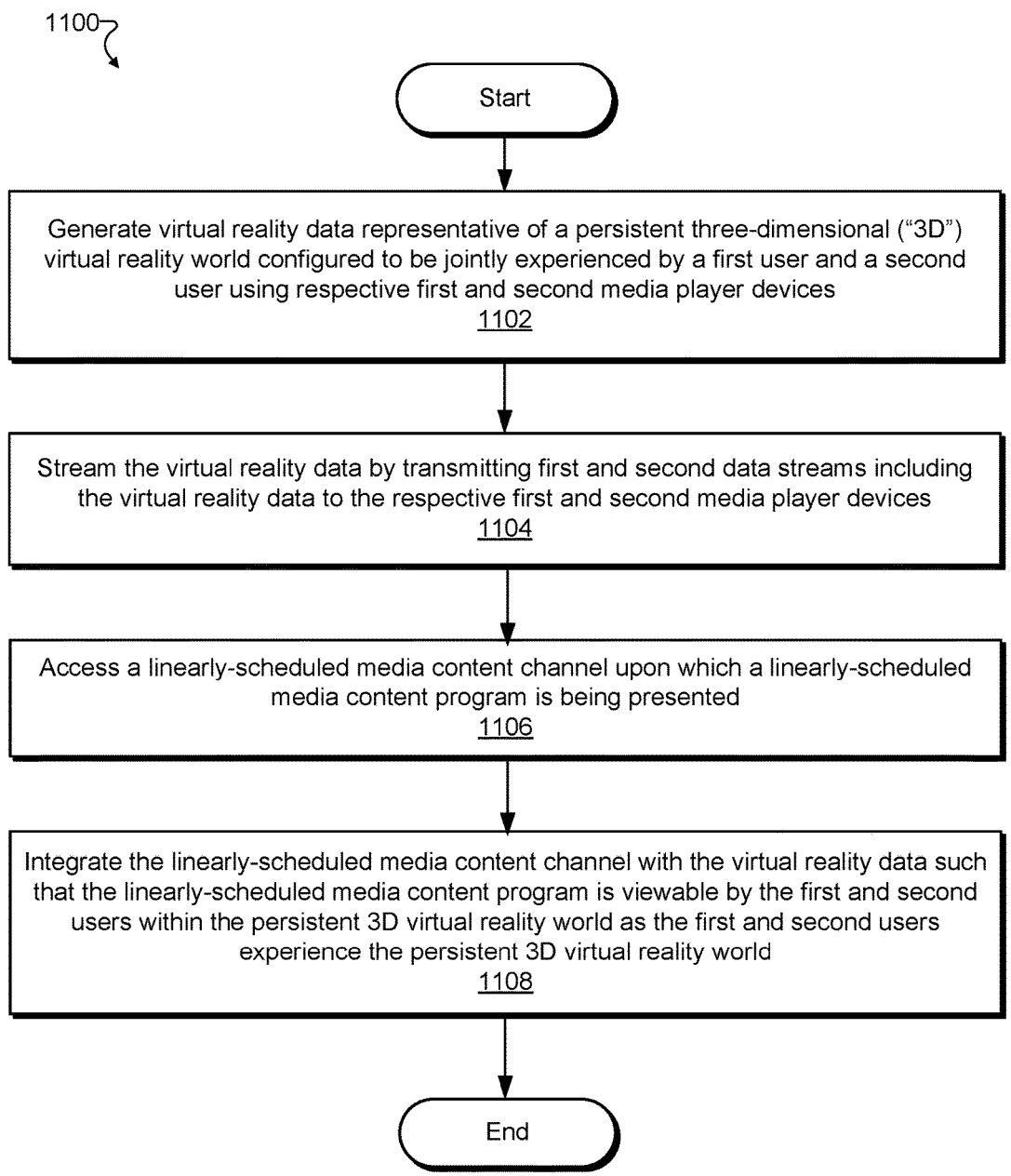

FIG. 11 illustrates an exemplary method 1100 for presenting a video stream within a persistent 3D virtual reality world. While FIG. 11 illustrates exemplary operations according to one embodiment, other embodiments may omit, add to, reorder, and/or modify any of the operations shown in FIG. 11. One or more of the operations shown in FIG. 11 may be performed by system 100, any components included therein, and/or any implementation thereof.

In operation 1102, a virtual reality system may generate virtual reality data representative of a persistent 3D virtual reality world configured to be jointly experienced by a first user and a second user using respective first and second media player devices. In some implementations, the persistent 3D virtual reality world may be configured for one-to-many streaming and configured to dynamically persist independently of whether either the first or second user is experiencing the persistent 3D virtual reality world. Operation 1102 may be performed in any of the ways described herein.

In operation 1104, the virtual reality system may stream the virtual reality data by transmitting a first data stream including the virtual reality data to the first media player device and transmitting a second data stream including the virtual reality data to the second media player device. Operation 1104 may be performed in any of the ways described herein.

In operation 1106, the virtual reality system may access a linearly-scheduled media content channel upon which a linearly-scheduled media content program is being presented. Operation 1106 may be performed in any of the ways described herein.

In operation 1108, the virtual reality system may integrate the linearly-scheduled media content channel with the virtual reality data such that the linearly-scheduled media content program is viewable by the first and second users within the persistent 3D virtual reality world as the first and second users experience the persistent 3D virtual reality world. In some examples, the virtual reality system may integrate the video data with the virtual reality data while operation 1102 is ongoing (e.g., while the virtual reality data is streaming). Operation 1108 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
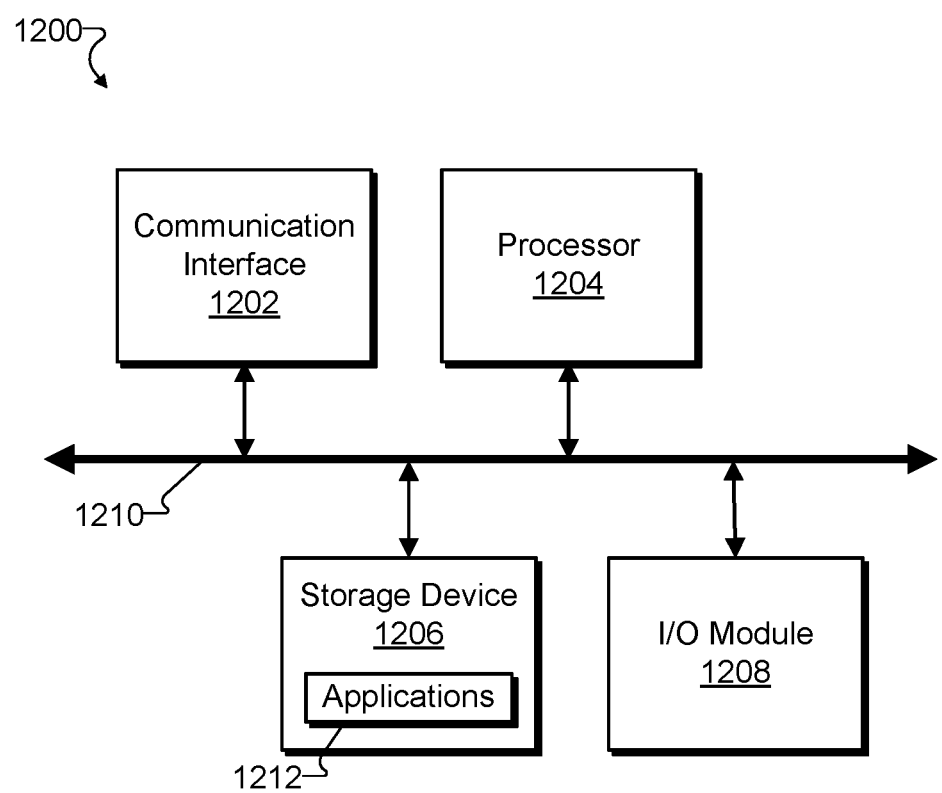
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with facilities 102 or 104 of system 100. Likewise, storage facility 106 of system 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    streaming, by a virtual reality presentation system, virtual reality data representative of a persistent three-dimensional ("3D") virtual reality world configured to be experienced by a user using a media player device while the virtual reality data is streaming, the persistent 3D virtual reality world configured for one-to-many streaming and generated based on a camera feed representative of a real-world scene physically located remotely from the user, wherein the camera feed is a live camera feed depicting a live event occurring at the real-world scene physically located remotely from the user;
    accessing, by the virtual reality presentation system, video data representative of two-dimensional ("2D") video content;
    integrating, by the virtual reality presentation system while the virtual reality data is streaming, the video data with the virtual reality data by virtually projecting the 2D video content onto a virtual screen within the persistent 3D virtual reality world to be viewable by the user as the user experiences the persistent 3D virtual reality world;
    determining, by the virtual reality presentation system as the 2D video content is virtually projected onto the virtual screen, that a particular content segment is being presented as part of the 2D video content;
    dynamically resizing, by the virtual reality presentation system in accordance with context of the particular content segment, the virtual screen to be larger or smaller without changing in aspect ratio; and
    virtually projecting, by the virtual reality presentation system, the particular content segment onto the dynamically resized virtual screen, the virtual projection of the particular content segment being larger or smaller without changing in aspect ratio so as to fill the dynamically resized virtual screen.

2. The method of claim 1, wherein:
    the accessing of the video data representative of the 2D video content includes accessing a linearly-scheduled media content channel; and
    the 2D video content represented by the video data includes a linearly-scheduled media content program being presented on the linearly-scheduled media content channel.

3. The method of claim 1, wherein:
    the accessing of the video data representative of the 2D video content includes accessing data representative of a non-linear media content program; and
    the 2D video content represented by the video data includes the non-linear media content program.

4. The method of claim 1, further comprising integrating, by the virtual reality presentation system while the virtual reality data is streaming, object data with the virtual reality data and the video data so as to dynamically modify an aspect of the persistent 3D virtual reality world as the user experiences the persistent 3D virtual reality world, the dynamic modification causing the aspect of the persistent 3D virtual reality world to be modified in accordance with a context of the 2D video content represented in the video data.

5. The method of claim 1, wherein:
    the streaming of the virtual reality data is performed by transmitting a first data stream including the virtual reality data to the media player device and transmitting a second data stream including the virtual reality data to an additional media player device used by an additional user;
    the persistent 3D virtual reality world is further configured to be experienced, independently of whether the user is experiencing the persistent 3D virtual reality world, by the additional user using the additional media player device while the virtual reality data is streaming.

6. The method of claim 1, further comprising:
    accessing, by the virtual reality presentation system, the live camera feed representative of the real-world scene; and generating, by the virtual reality presentation system based on the live camera feed representative of the real-world scene, the virtual reality data representative of the persistent 3D virtual reality world;
wherein:
the virtual reality presentation system is at least partially implemented by a server-side virtual reality provider system that performs the generating and the streaming of the virtual reality data; and
the server-side virtual reality provider system performs the streaming of the virtual reality data by transmitting a data stream including the virtual reality data to a client-side system including the media player device.

7. The method of claim 6, wherein the server-side virtual reality provider system performs the generating and the streaming of the virtual reality data in accordance with a stateful one-to-many paradigm whereby the virtual reality data is broadcast to a plurality of client devices simultaneously to allow a plurality of users to jointly experience the persistent 3D virtual reality world while only one instance of the persistent 3D virtual reality world is maintained.

8. The method of claim 1, further comprising:
accessing, by the virtual reality presentation system, additional video data representative of additional 2D video content different from the 2D video content;
integrating, by the virtual reality presentation system while the virtual reality data is streaming and the video data is integrated with the virtual reality data, the additional video data with the virtual reality data such that, in addition to the 2D video content being viewable by the user, the additional 2D video content is also viewable by the user within the persistent 3D virtual reality world as the user experiences the persistent 3D virtual reality world.

9. The method of claim 1, embodied as computer-executable instructions on at least one non-transitory computer-readable medium.

10. The method of claim 1, further comprising:
determining, by the virtual reality presentation system as the 2D video content is virtually projected onto the dynamically resized virtual screen, that an additional particular content segment is being presented as part of the 2D video content;
dynamically resizing, by the virtual reality presentation system in accordance with context of the additional particular content segment, the virtual screen to return to an original size of the virtual screen prior to the dynamic resizing to be larger or smaller; and
virtually projecting, by the virtual reality presentation system, the additional particular content segment onto the dynamically resized virtual screen, the virtual projection of the additional particular content segment being the original size so as to fill the dynamically resized virtual screen.

11. A method comprising:
generating, by a virtual reality system, virtual reality data representative of a persistent three-dimensional ("3D") virtual reality world configured to be jointly experienced by a first user and a second user using respective first and second media player devices, the persistent 3D virtual reality world configured for one-to-many streaming and generated based on a camera feed representative of a real-world scene physically located remotely from the user, wherein the camera feed is a live camera feed depicting a live event occurring at the real-world scene physically located remotely from the user;
streaming, by the virtual reality system, the virtual reality data by transmitting a first data stream including the virtual reality data to the first media player device and transmitting a second data stream including the virtual reality data to the second media player device;
accessing, by the virtual reality system, a linearly-scheduled media content channel upon which a linearly-scheduled media content program is being presented;
integrating, by the virtual reality system while the virtual reality data is streaming, the linearly-scheduled media content channel with the virtual reality data by virtually projecting the linearly-scheduled media content program onto a virtual screen-within the persistent 3D virtual reality world to be viewable by the first and second users as the first and second users experience the persistent 3D virtual reality world;
determining, by the virtual reality presentation system as the linearly-scheduled media content program is virtually projected onto the virtual screen, that a particular content segment is being presented as part of the linearly-scheduled media content program;
dynamically resizing, by the virtual reality presentation system in accordance with context of the particular content segment, the virtual screen to be larger or smaller without changing in aspect ratio; and
virtually projecting, by the virtual reality presentation system, the particular content segment onto the dynamically resized virtual screen, the virtual projection of the particular content segment being larger or smaller without changing in aspect ratio so as to fill the dynamically resized virtual screen.

12. The method of claim 11, embodied as computer-executable instructions on at least one non-transitory computer-readable medium.

13. A system comprising:
at least one physical computing device that
streams virtual reality data representative of a persistent three-dimensional ("3D") virtual reality world configured to be experienced by a user using a media player device while the virtual reality data is streaming, the persistent 3D virtual reality world configured for one-to-many streaming and generated based on a camera feed representative of a real-world scene physically located remotely from the user, wherein the camera feed is a live camera feed depicting a live event occurring at the real-world scene physically located remotely from the user;
accesses video data representative of two-dimensional ("2D") video content;
integrates, while the virtual reality data is streaming, the video data with the virtual reality data by virtually projecting the 2D video content onto a virtual screen within the persistent 3D virtual reality world to be viewable by the user as the user experiences the persistent 3D virtual reality world;
determines, as the 2D video content is virtually projected onto the virtual screen, that a particular content segment is being presented as part of the 2D video content;
dynamically resizes, in accordance with context of the particular content segment, the virtual screen to be larger or smaller without changing in aspect ratio; and virtually projects the particular content segment onto the dynamically resized virtual screen, the virtual projection of the particular content segment being larger or smaller without changing in aspect ratio so as to fill the dynamically resized virtual screen.

14. The system of claim 13, wherein:
the at least one physical computing device accesses the video data representative of the 2D video content by accessing a linearly-scheduled media content channel; and
the 2D video content represented by the video data includes a linearly-scheduled media content program being presented on the linearly-scheduled media content channel.

15. The system of claim 13, wherein:
the at least one physical computing device accesses the video data representative of the 2D video content by accessing data representative of a non-linear media content program; and
the 2D video content represented by the video data includes the non-linear media content program.

16. The system of claim 13, wherein the at least one physical computing device further integrates, while the virtual reality data is streaming, object data with the virtual reality data and the video data so as to dynamically modify an aspect of the persistent 3D virtual reality world as the user experiences the persistent 3D virtual reality world, the dynamic modification causing the aspect of the persistent 3D virtual reality world to be modified in accordance with a context of the 2D video content represented in the video data.

17. The system of claim 13, wherein:
the at least one physical computing device streams the virtual reality data by transmitting a first data stream including the virtual reality data to the media player device and transmitting a second data stream including the virtual reality data to an additional media player device used by an additional user;
the persistent 3D virtual reality world is further configured to be experienced, independently of whether the user is experiencing the persistent 3D virtual reality world, by the additional user using the additional media player device while the virtual reality data is streaming.

18. The system of claim 13, wherein:
the at least one physical computing device further
accesses the live camera feed representative of the real-world scene, and
generates, based on the live camera feed representative of the real-world scene, the virtual reality data representative of the persistent 3D virtual reality world;
the system is at least partially implemented by a server-side virtual reality provider system that generates and streams the virtual reality data; and
the server-side virtual reality provider system streams the virtual reality data by transmitting a data stream including the virtual reality data to a client-side system including the media player device.

19. The system of claim 18, wherein the server-side virtual reality provider system performs the generating and the streaming of the virtual reality data in accordance with a stateful one-to-many paradigm whereby the virtual reality data is broadcast to a plurality of client devices simultaneously to allow a plurality of users to jointly experience the persistent 3D virtual reality world while only one instance of the persistent 3D virtual reality world is maintained.

20. The system of claim 13, wherein the at least one physical computing device further:
determines, as the 2D video content is virtually projected onto the dynamically resized virtual screen, that an additional particular content segment is being presented as part of the 2D video content;
dynamically resizes, in accordance with context of the additional particular content segment, the virtual screen to return to an original size of the virtual screen prior to the dynamic resizing to be larger or smaller; and
virtually projects the additional particular content segment onto the dynamically resized virtual screen, the virtual projection of the additional particular content segment being the original size so as to fill the dynamically resized virtual screen.

\* \* \* \* \*